US007602727B2

(12) United States Patent
Yamauchi (10) Patent No.: US 7,602,727 B2
(45) Date of Patent: Oct. 13, 2009

(54) METHOD AND APPARATUS FOR RESOLVING DEADLOCK OF AUTO-NEGOTIATION SEQUENCE BETWEEN SWITCHES

(75) Inventor: Toshiro Yamauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 721 days.

(21) Appl. No.: 10/953,558

(22) Filed: Sep. 30, 2004

(65) Prior Publication Data
US 2005/0073950 A1 Apr. 7, 2005

(30) Foreign Application Priority Data
Oct. 1, 2003 (JP) ............... 2003-342749

(51) Int. Cl.
*H04L 12/26* (2006.01)
(52) U.S. Cl. ............... 370/243; 370/401; 709/223
(58) Field of Classification Search ............ 370/246, 370/242, 243, 248, 250, 401, 402; 709/223–226
See application file for complete search history.

(56) References Cited

U.S. PATENT DOCUMENTS

| 5,884,041 | A  | * | 3/1999  | Hurwitz ............... 709/228 |
| 5,920,698 | A  | * | 7/1999  | Ben-Michael et al. ....... 709/224 |
| 6,002,675 | A  | * | 12/1999 | Ben-Michael et al. ....... 370/315 |
| 6,215,816 | B1 |   | 4/2001  | Gillespie et al. |
| 6,442,170 | B1 | * | 8/2002  | Perlman et al. ............ 370/401 |
| 6,735,679 | B1 | * | 5/2004  | Herbst et al. ............... 711/167 |
| 6,810,021 | B1 | * | 10/2004 | Sakurai ................... 370/255 |
| 7,292,596 | B1 | * | 11/2007 | Campana et al. .......... 370/419 |
| 2003/0187977 | A1 | * | 10/2003 | Cranor et al. ............ 709/224 |

FOREIGN PATENT DOCUMENTS

| JP | 9-331512 A     | 12/1997 |
| JP | 1-101760 A     | 4/1998  |
| JP | 10-294777 A    | 11/1998 |
| JP | 11-27309 A     | 1/1999  |
| JP | 2001-197114 A  | 7/2001  |
| JP | 2001-197154 A  | 7/2001  |
| JP | 2003-179555 A  | 6/2003  |
| JP | 2003-273939 A  | 9/2003  |
| JP | 2003-274452 A  | 9/2003  |

* cited by examiner

*Primary Examiner*—Ricky Ngo
*Assistant Examiner*—Gary Mui
(74) *Attorney, Agent, or Firm*—Sughrue Mion, PLLC (57) ABSTRACT

A transmission repeater has a function of recovery to normal out of the deadlock state of auto-negotiation sequence between switches. The switches exchange auto-negotiation configuration codes via first and second transmission repeaters for a state transition. The first transmission repeater monitors auto-negotiation configuration codes among data transmitted from the opposed switch, and when detecting more than a predetermined number of configuration codes of auto-negotiation having been transmitted during a given period of time, determines that the auto-negotiation sequence between the switches is at a deadlock, and reports it to the second transmission repeater, which then disconnects optical signals from the sending end of the second transmission repeater to the switch for more than twice the propagation time of signals between the switches, thus resolving the deadlock between the switches.

28 Claims, 12 Drawing Sheets

METHOD AND APPARATUS FOR RESOLVING DEADLOCK OF AUTO-NEGOTIATION SEQUENCE BETWEEN SWITCHES

TECHNICAL FIELD

The present invention relates to a method and apparatus for resolving deadlock of an auto-negotiation sequence between switches, and, more specifically, to networks, transmission repeaters and switch devices, and a method for controlling transmission of signals of auto-negotiation under the supervision of an auto-negotiation sequence.

BACKGROUND OF THE INVENTION

Network devices that share a link segment advertise modes of operation available for each other before starting to send and receive data, and selects operation modes suitable for each of the two network devices. This function is specified as the 1000-BASE-X auto-negotiation function in clause 37 of IEEE Standards 802.3-2002, Institute of Electrical and Electronics Engineers, Inc., section three, pages 78-101, which is referred to as reference 1 below. Clause 37 is incorporated by reference as if fully set forth herein.

In the 1000-BASE-X auto-negotiation, when auto-negotiation is completed by exchanging auto-negotiation configuration codes with /C/ordered_sets between the two network devices, normal connection between the network devices is recognized and the status of the link is brought up, which makes it possible to send and receive data between the network devices. In the link-OK state, configuration codes are not transmitted any more from the network devices.

However, in the 1000-BASE-X auto-negotiation there is a possibility of coming to a deadlock where auto-negotiation is never complete, when the propagation time of signals between the devices in which auto-negotiation is performed, such as Ethernet switches, is too long, that is, when the propagation time is more than half the time of a link timer for auto-negotiation.

Such a deadlock occurs because specific codes transmitted from the opposed Ethernet switch in the preceding auto-negotiation sequence arrive during the progress of the present auto-negotiation sequence due to propagation delay, and cause the present auto-negotiation state to change, resulting in a restart of the present auto-negotiation sequence.

Usually, such a state does not take place as far as auto-negotiation does not restart in unexpected part of a process of auto-negotiation. Such a restart happens when invalid codes, or codes not specified in clause 36 of IEEE Standards 802.3-2002, section three, pages 32-77, which is incorporated by reference, come to be mixed. For example, when a system is gradually recovered from a failure, such as a cutoff of optical fiber cables between Ethernet switches, through a state of transmission performance degradation, invalid codes are mixed in the auto-negotiation sequence, resulting in a deadlock.

Therefore, in case that Ethernet switches are arranged so far away from each other that the propagation time of signals is too long, auto-negotiation may come to a deadlock and fail to establish the port, or fail to transmit data, depending on the way to repair failure between switches.

However, the auto-negotiation sequence can be initialized, which enables the auto-negotiation to get out of the deadlock state by disconnecting optical signals for more than twice the propagation time of signals between Ethernet switches and transmitting configuration codes representing a restart of the auto-negotiation from the Ethernet switch.

Some Ethernet switches currently on the market are not in conformity with the IEEE 802.3 Standards, so that some combinations of Ethernet switches make the auto-negotiation reach a deadlock, depending on the timing of recovery from a failure, and make it impossible to establish the connected port, regardless of the length of the propagation time of signals between Ethernet switches.

In this way, a recovery timing of failure may make auto-negotiation between Ethernet switches to come to a deadlock, resulting in a failure to bring the port up.

As stated above, conventional Ethernet switches may keep auto-negotiation uncompleted to come to a deadlock where the port is not brought up. Also, even if a transmission repeater is placed between Ethernet switches, the conventional transmission repeater has the same problem because it just transfers signals between Ethernet switches.

SUMMARY OF THE INVENTION

An object of the present invention is to overcome the above-described disadvantages by providing a network, repeating-transmission apparatus and switch devices where a deadlock state of auto-negotiation sequences between switches is recovered back to normal.

Another object of the present invention is to provide a method for controlling transmission of signals of auto-negotiation used therein, resolving a deadlock state of auto-negotiation sequences between switches.

According to the present invention, there is provided a network for transmitting Local Area Network (LAN) signals between first and second switch devices, comprising an auto-negotiation monitor unit for monitoring given codes of auto-negotiation to execute a connection protocol between the first and second switch devices and for detecting a deadlock state where the given codes are kept transmitted, and an optical signal control unit responsive to the detection of the deadlock state for disconnecting optical signals to be sent to a receiving end of any port of the first and second switch devices for a given period of time.

The auto-negotiation monitor unit detects the deadlock state when detecting more than a predetermined number of given codes within a predetermined period of time.

The given period of time is more than twice the propagation time of signals between the first and second switch devices.

According to another aspect of the invention, a repeating-transmission apparatus is provided for relaying LAN signals between first and second switch devices, the repeating-transmission apparatus comprising an auto-negotiation monitor unit for monitoring given codes of auto-negotiation to execute a connection protocol between the first and second switch devices and for detecting a deadlock state where the given codes are kept transmitted, and an optical signal control unit responsive to the detection of the deadlock state for disconnecting optical signals to be sent to a receiving end of any port of the first and second switch devices for a given period of time.

According to yet another aspect of the invention, a switch device is provided that transmits LAN signals to a receiving end via a repeating-transmission apparatus. The switch device includes a monitor unit for detecting, by monitoring given codes of auto-negotiation to execute a connection protocol with the receiving end, a deadlock state where the given codes are kept transmitted, and an optical signal control unit for disconnecting optical signals for a given period of time, when the deadlock state is detected.

The present invention also provides a method of controlling optical signals in a network for transmitting LAN signals between switch devices via a repeating-transmission apparatus. The method comprises a first step of detecting, by monitoring given codes of auto-negotiation to execute a connection protocol between the switch devices, a deadlock state where the given codes are kept transmitted from the switch device, and a second step of disconnecting optical signals for a given period of time, when said deadlock state is detected.

In summary, the network of the present invention includes a function of, when an auto-negotiation sequence between LAN switches, or Media Access Control (MAC) switches in a LAN signal transmitter comes to a deadlock, recovering from the deadlock state to normal, or a function of initializing the deadlock state of auto-negotiation by disconnecting optical signals.

The deadlock state here represents the state where auto-negotiation is not completed because exchanging auto-negotiation configuration codes are kept between LAN switches, resulting in a failure to establish the port, or a failure to transmit data.

To be specific, the network of the present invention monitors auto-negotiation configuration codes specified in reference 1 among the data transmitted from the opposed switch, and if it detects more than a predetermined number of configuration codes of auto-negotiation being transmitted for a predetermined period of time, determines that the auto-negotiation sequence between switches is at a deadlock and reports it to the opposed repeating-transmission apparatus, which then disconnects optical signals from the sending end to the receiving switch for a given period of time.

As described above, in the network of the present invention, auto-negotiation between switches can be monitored by observing auto-negotiation sequences between switches. And even if the auto-negotiation sequence is at a deadlock, the deadlock state can be ended and recovered to normal by disconnecting optical signals to the receiving switch from the sending end for a given period of time in the opposed repeating-transmission apparatus.

Accordingly, in the network of the present invention, even if auto-negotiation between switches connected by, for example, the 1000-BASE-X type reaches a deadlock, the switches can break out of the deadlock state because optical signals between the switches are disconnected for a given period of time.

BRIEF DESCRIPTION OF THE DRAWINGS

A more complete understanding of the invention may be obtained from a consideration of the following description in conjunction with the drawings in which.

DESCRIPTION OF THE PREFERRED EMBODIMENT

Figure 1:
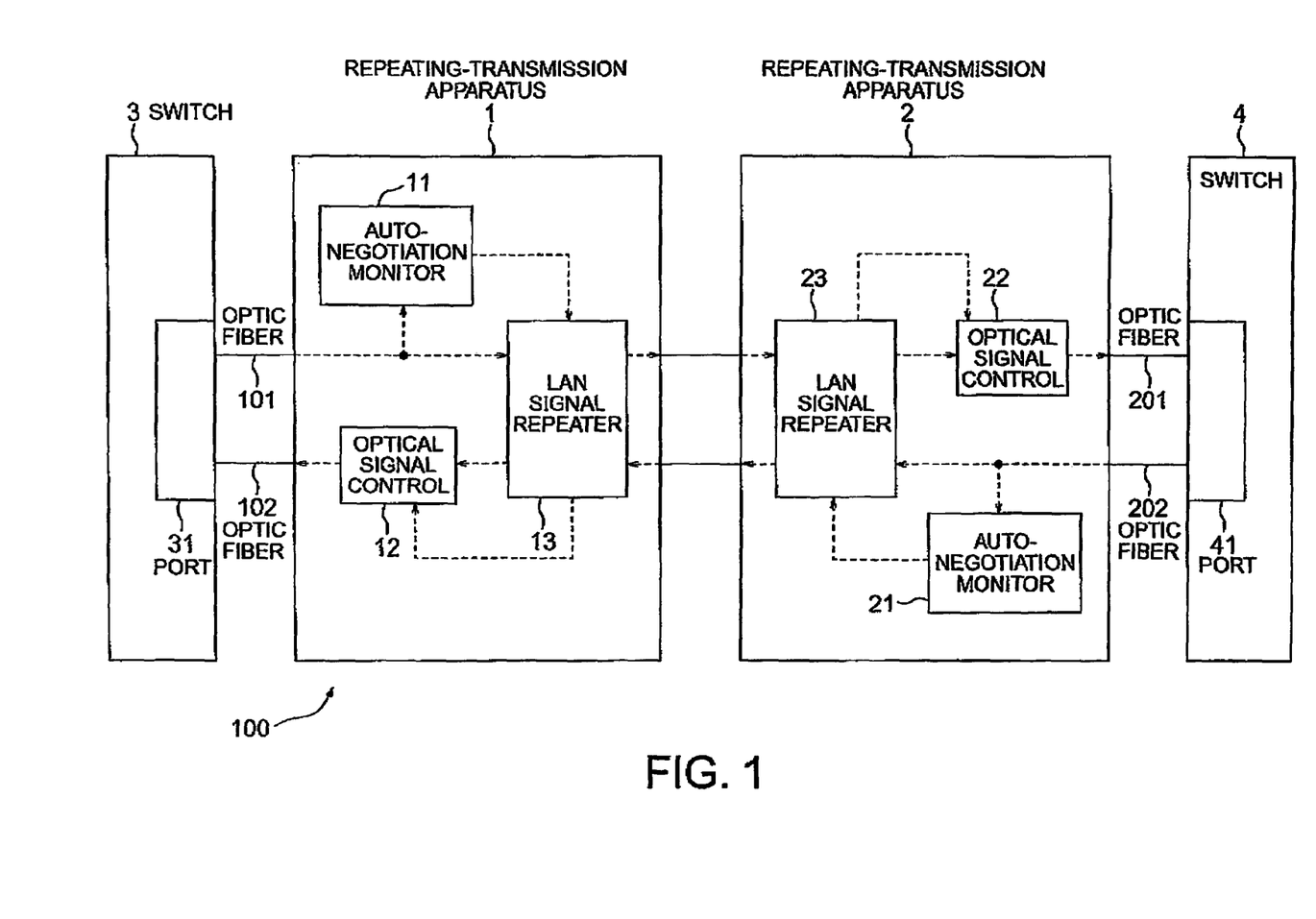
FIG. 1 is a block diagram of a network in accordance with the first embodiment of the present invention.

FIG. 1 is a block diagram of a network in accordance with the embodiment of the present invention. In FIG. 1, the network 100 comprises repeating-transmission apparatus, or transmission repeaters 1 and 2, and switches 3 and 4. The repeating-transmission apparatus 1 and the switch 3 are connected by optical fibers 101 and 102, and the repeating-transmission apparatus 2 and the switch 4 by optical fibers 201 and 202, and switches 3 and 4 being connected via the repeating-transmission apparatus 1 and 2.

Each of the switches 3 and 4 is an Ethernet switch, or a Media Access Control (MAC) switch, having a function of transferring frames and a function of auto-negotiation, and having ports 31 and 41 of the 1000-BASE-X type. The function of transferring frames is specified in clause 3 of IEEE Standards 802.3-2002, section one, pages 38-43, referred to as reference 2, which is also incorporated by reference as if fully set forth herein, while the function of auto-negotiation is specified in reference 1. Ethernet is represented as Local Area Network (LAN) in the following description (Ethernet is a registered trademark of the Xerox Corporation.).

The repeating-transmission apparatus 1 and 2 comprise the auto-negotiation monitor units 11 and 21, optical signal controls, or control units 12 and 22, and LAN signal repeaters 13 and 23, respectively, relaying and transmitting signals from the switches 3 and 4, respectively.

The auto-negotiation monitor units 11 and 21 can switch from valid operation to invalid operation and vice versa. The auto-negotiation monitor unit 11 has a function of monitoring auto-negotiation configuration codes, /C/ordered_sets, among the signals transmitted from the switch 3 and counting the number of the codes while the auto-negotiation monitor unit 21 has a function of monitoring auto-negotiation configuration codes, /C/ordered_sets, among the signals transmitted from the switch 4 and counting the number of the codes.

The optical signal control unit 12 has a function of disconnecting optical signals to the switch 3 for a given period of time. The optical signal control unit 22 has a function of disconnecting optical signal output to the switch 4 for a given period of time.

According to the embodiment of the present invention, the repeating-transmission apparatus 1 and 2 have a function of, when auto-negotiation sequences between the switches 3 and 4 come to a deadlock, recovering from it to normal.

The deadlock state here indicates a state where the switches 3 and 4 keep interchanging auto-negotiation configuration codes between them, so that auto-negotiation is not completed, resulting in a failure to uplink the ports 31 and 41.

The repeating-transmission apparatus 1 monitors auto-negotiation configuration codes specified in reference 1 among the data transmitted from the opposed switch 3, and when detecting more than a predetermined number of configuration codes of auto-negotiation having been transmitted during a given period of time, determines that the auto-negotiation sequence between the switches 3 and 4 is at a deadlock, and reports it to the opposed repeating-transmission apparatus 2, which then disconnects optical signals to be sent therefrom to the switch 4 for a given period of time.

Thus, in the embodiment of the present invention, auto-negotiation between the switches 3 and 4 is monitored by observing the auto-negotiation sequence between switches 3 and 4 in the repeating-transmission apparatus 1. When the auto-negotiation sequence reaches a deadlock, the deadlock state can be ended and recovered to normal by disconnecting optical signals from the repeating-transmission apparatus 2 to the switch 4 for a given period of time.

In more detail, the repeating-transmission apparatus 1 monitors auto-negotiation configuration codes, /C/ordered_sets, specified in reference 1 among the signals transmitted from the switch 3 and counts the number of configuration codes of auto-negotiation transmitted from the switch 3 for a given period of time. When the number exceeds a certain threshold, the repeating-transmission apparatus 1 judges auto-negotiation between the switches 3 and 4 to be at a deadlock and report it to the opposed transmission repeater 2, which then disconnects the optical signal output to the optical fiber 201 for a given period of time to end the deadlock state of the auto-negotiation sequence between the switches 3 and 4. The disconnection of optical signal output continues for more than twice the propagation time of optical signals between the switches 3 and 4.

In this embodiment of the present invention, if auto-negotiation between the switches 3 and 4 connected by, for example, the 1000-BASE-X type reaches a deadlock, the switches 3 and 4 can break out of the deadlock state because optical signals between the switches 3 and 4 are disconnected for a given period of time.

Figure 2:
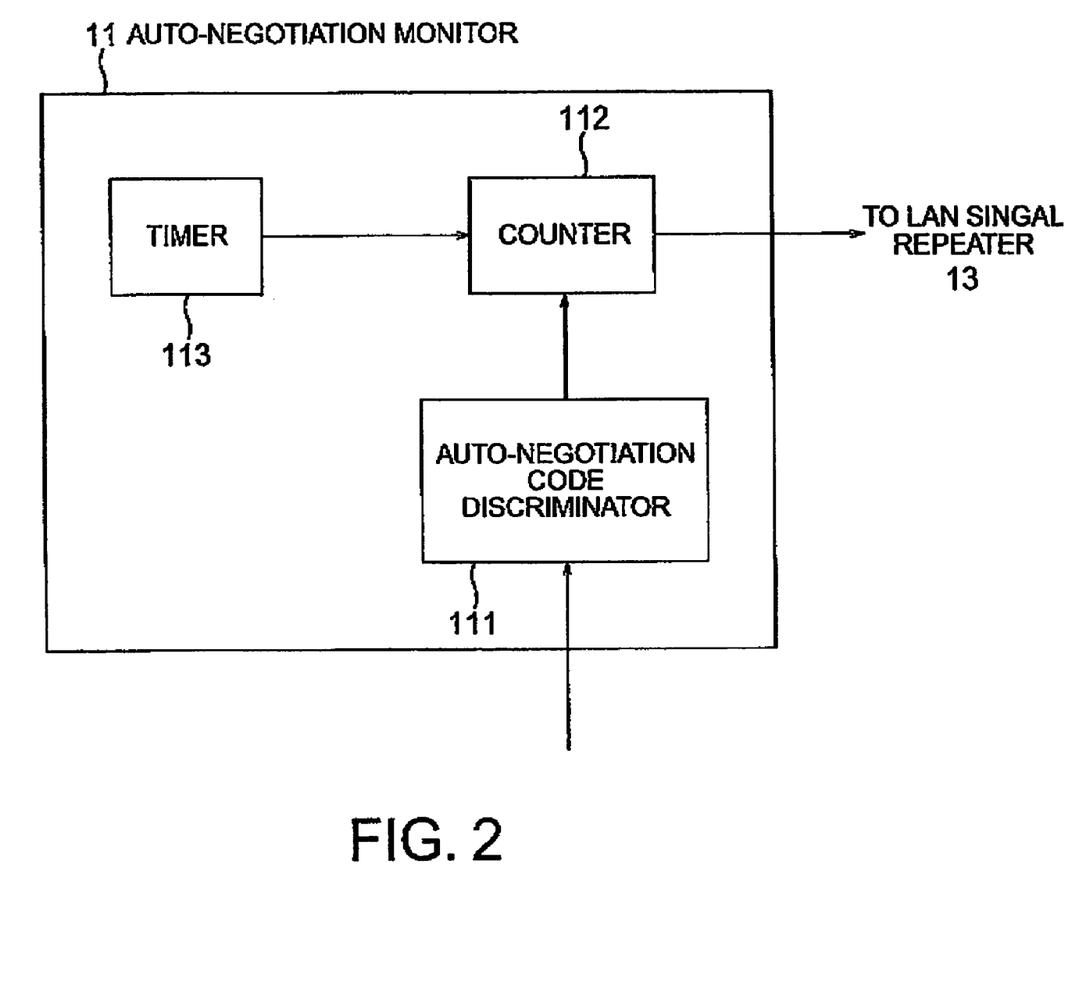
FIG. 2 is a block diagram of an auto-negotiation monitor unit for use in the first embodiment of the present invention.

FIG. 2 is a block diagram of a configuration of an auto-negotiation monitor unit employed in the first embodiment of the present invention. In FIG. 2, the auto-negotiation monitor unit 11 comprises an auto-negotiation code discriminator or identifier 111 for discriminating or identifying configuration codes among input signals, a counter 112 for counting auto-negotiation configuration codes and a timer 113.

Figure 3:
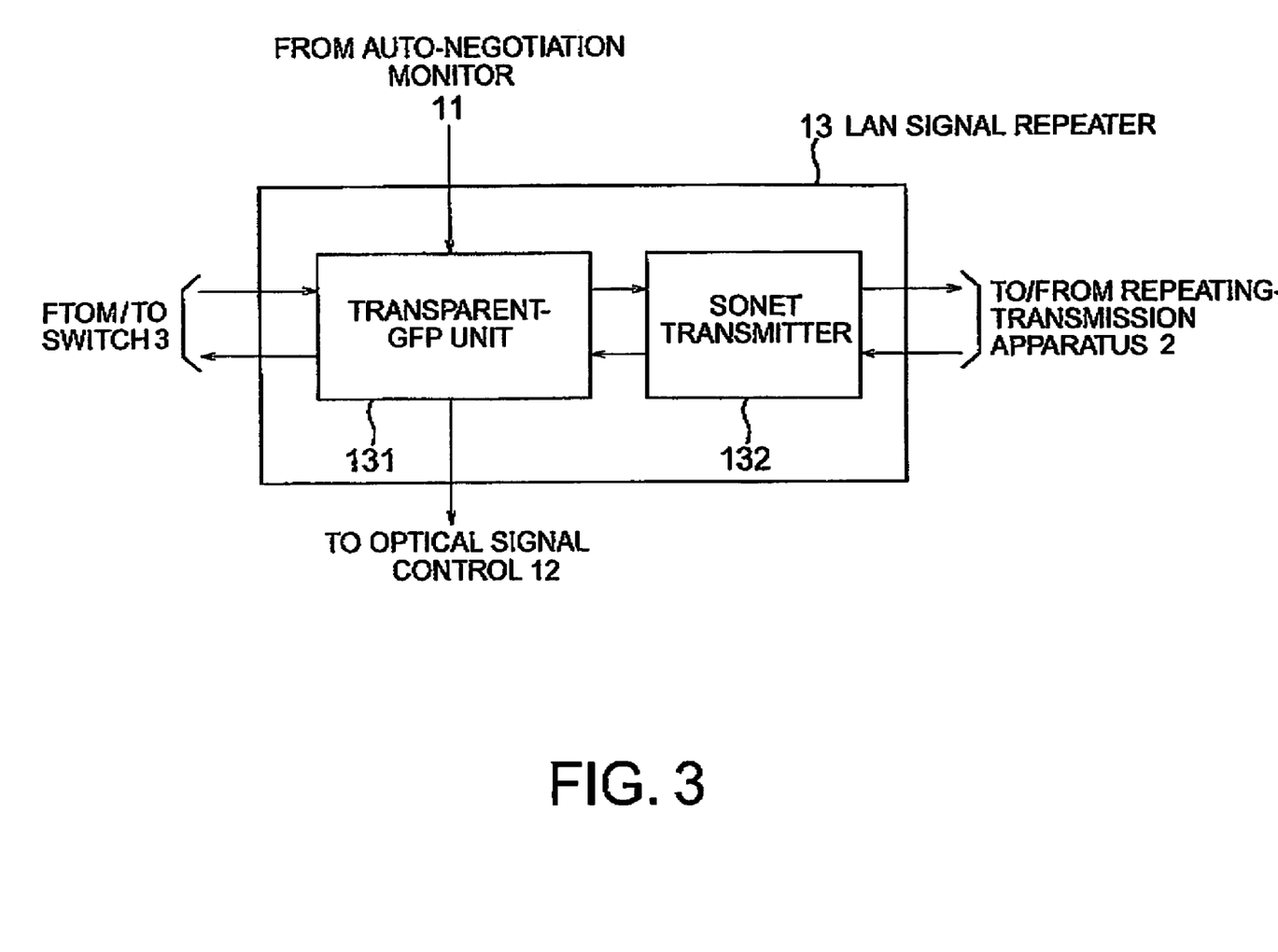
FIG. 3 is a block diagram of a LAN signal repeater in a repeating-transmission apparatus for use in the first embodiment of the present invention.

FIG. 3 is a block diagram showing a configuration of a LAN signal repeater used in FIG. 1. In FIG. 3, the LAN signal repeater 13 includes a Transparent Generic Framing Procedure (GFP) unit 131 and a Synchronous Optical Network (SONET) transmitter 132. Transparent-GFP is a framing system prescribed in International Telecommunication Union Telecommunication (ITU-T) Standardization Sector G. 7041.

The Transparent-GFP unit 131 encapsulates LAN signals input from the switch 3 into a Transparent-GFP frame to transmit it to the SONET transmitter 132, or reversely derives LAN signals from a Transparent-GFP frame input from the SONET transmitter 132 by decapsulating the Transparent-GFP frame into the LAN signals to transmit them to the switch 3.

The SONET transmitter 132 maps signals input from the Transparent-GFP unit 131 on a SONET payload to transmit it to the repeating-transmission apparatus 2, or reversely derives signals from a SONET payload input from the repeating-transmission apparatus 2 to transmit them to the Transparent-GFP unit 131.

Figure 4:
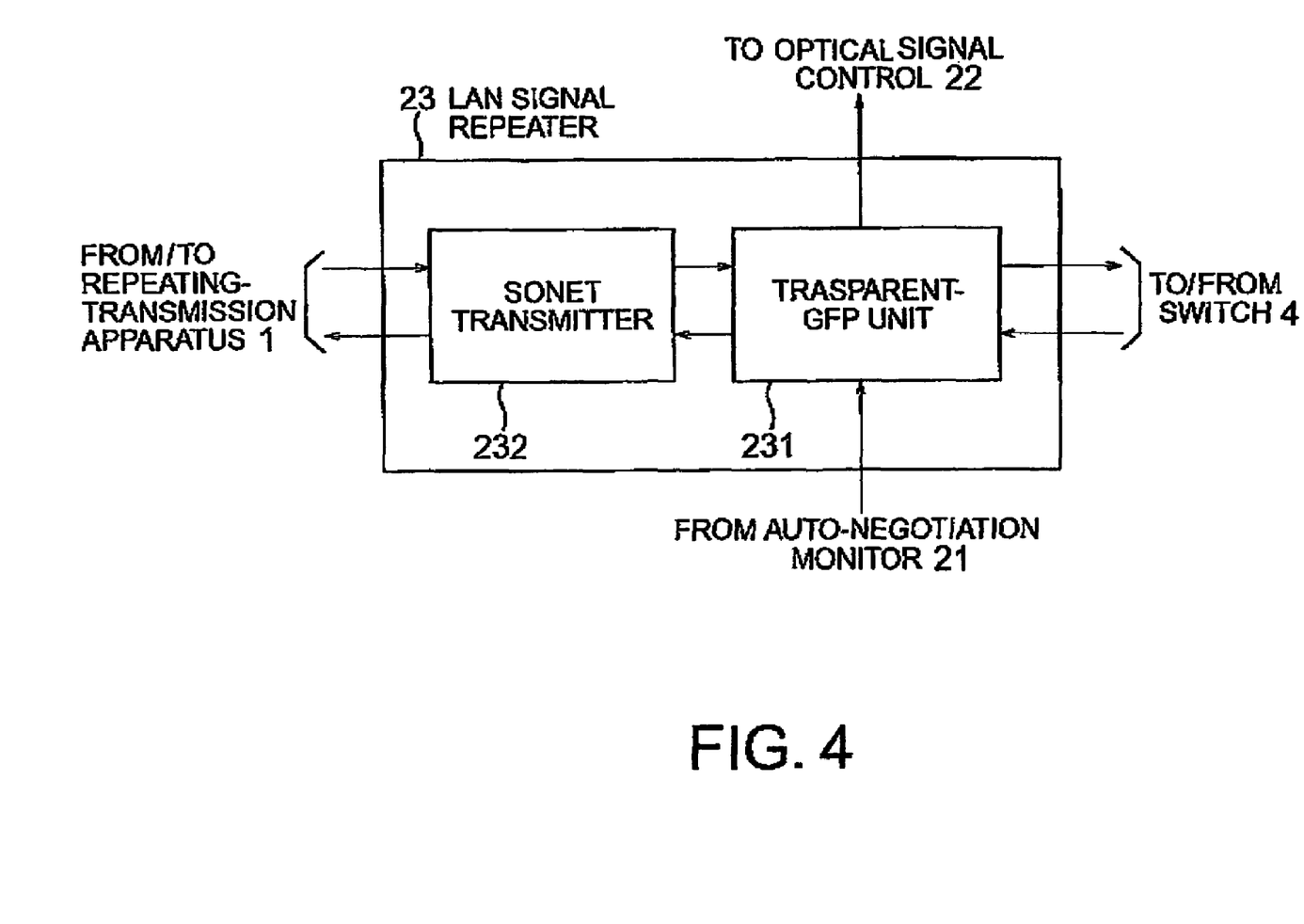
FIG. 4 is a block diagram of a LAN signal repeater in the opposed repeating-transmission apparatus for use in the first embodiment of the present invention.

FIG. 4 is a block diagram of a configuration of a LAN signal repeater contained in the repeating-transmission apparatus 2. In FIG. 4, the LAN signal repeater 23 comprises a Transparent-GFP unit 231 and a SONET transmitter 232. The Transparent-GFP unit 231 encapsulates LAN signals input from the switch 4 into a Transparent-GFP frame to transmit it to the SONET transmitter 232, or reversely decapsulates a Transparent-GFP frame input from the SONET transmitter 232 into LAN signals and transmits them to the switch 4.

The SONET transmitter 232 maps signals input from the Transparent-GFP unit 231 on a SONET payload to transmit it to the repeating-transmission apparatus 1, or reversely derives signals from a SONET payload input from the repeating-transmission apparatus 1 to transmit them to the Transparent-GFP unit 231.

In the above-described embodiment, the Transparent-GFP units 131 and 231 are used for encapsulating LAN signals into the Transparent-GFP frames. As an alternative, for encapsulation, use may be made of a High-level Data Link Control (HDLC) frame.

While the SONET transmitters 132 and 232 are used for relay and transmission in the above-mentioned embodiment, the Wavelength Division Multiplexing (WDM) techniques may be used.

Moreover, in this embodiment, any system can be used for relay and transmission as long as it can relay and transmit LAN signals and has a means for reporting a deadlock to the opposed repeating-transmission apparatus.

Furthermore, in the above embodiment, while the auto-negotiation code discriminators 11 and 21 are provided for the repeating-transmission apparatus 1 and 2, no problem occurs in operation even if either one of the auto-negotiation code discriminators, for example, the auto-negotiation discriminator 21 may be nullified in function.

Figure 5:
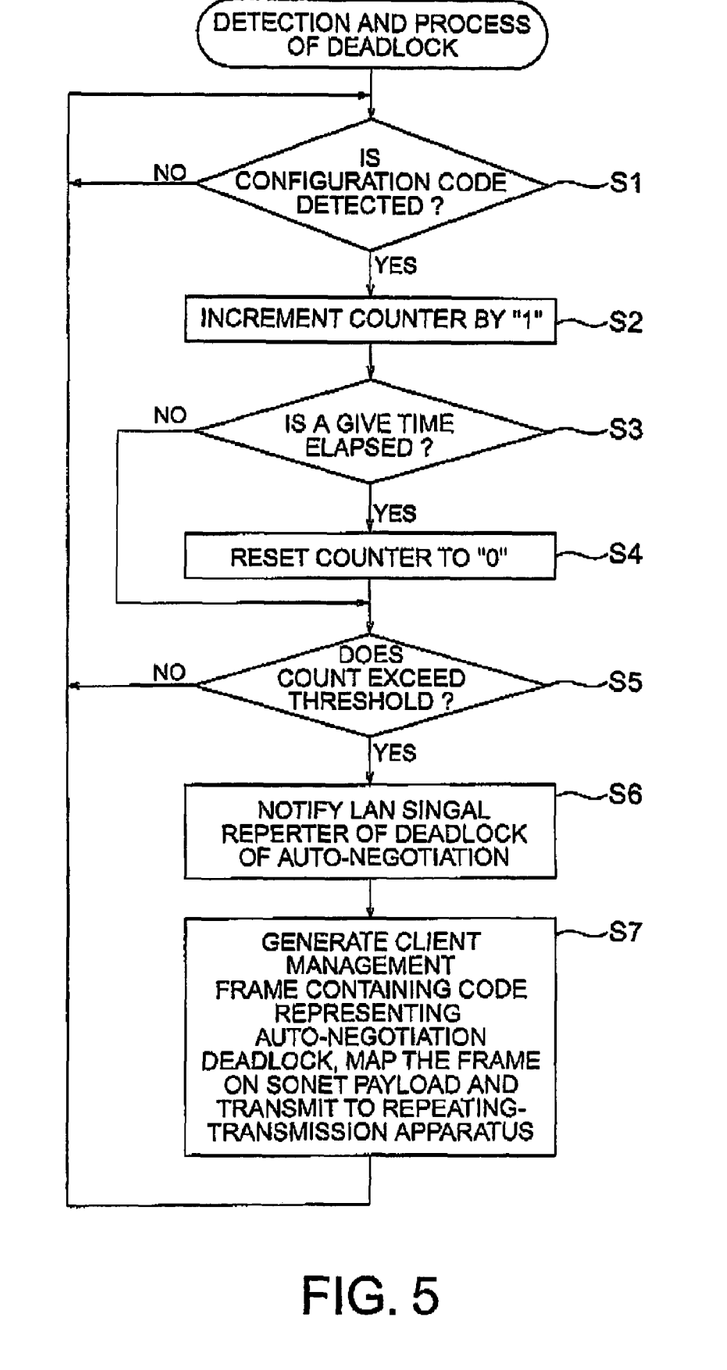
FIG. 5 is a flowchart illustrating a detection and processing of a deadlock state in accordance with the first embodiment of the present invention.
Figure 6:
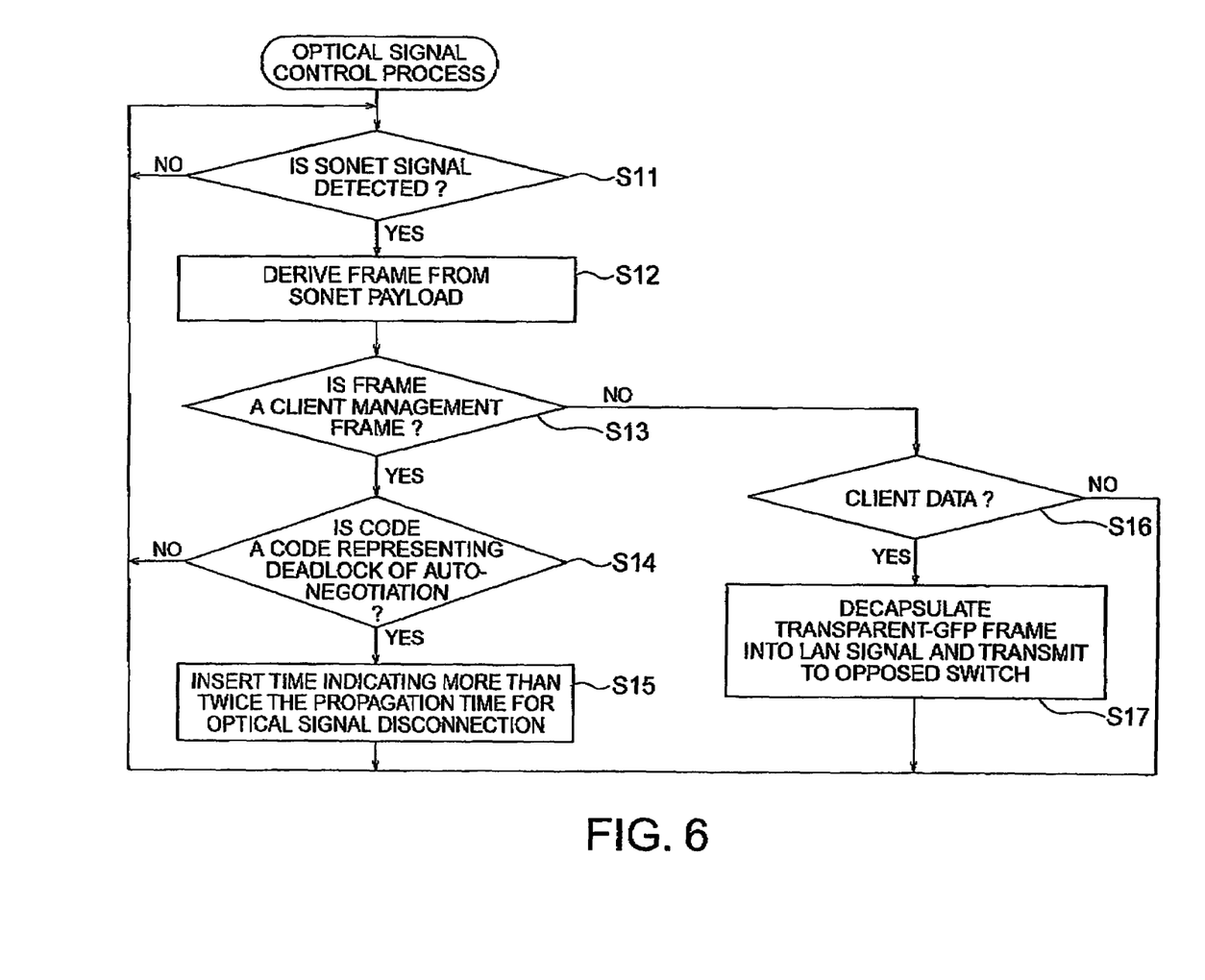
FIG. 6 is a flowchart showing a control and processing of optical signals in accordance with the first embodiment of the present invention.

FIGS. 5 and 6 are flowcharts, according to the first embodiment of the invention, showing a detection process of the deadlock state and an optical signal control process, respectively. Referring to FIGS. 1 to 6, processing operation of the network according to the first embodiment is described.

LAN signals output from the port 31 of the switch 3 are input to the repeating-transmission apparatus 1 through the optical fiber 101 and are provided to the auto-negotiation monitor unit 11 and the LAN signal repeater 13, respectively.

In the auto-negotiation monitor unit 11, the LAN signals enter the auto-negotiation discriminator 111 which determines whether or not the code of the input signals is the auto-negotiation configuration code (step s1 in FIG. 5). If it is discriminated or identified as the auto-negotiation configuration code, then the value of the counter 112 is incremented by 1 (step s2 in FIG. 5). Meanwhile, the timer 113 initializes the value of the counter 112 to zero (step s4 in FIG. 5) after a predetermined time (step s3 in FIG. 5). In other words, the auto-negotiation discriminator 111 increments the value of the counter 112 while the timer 113 initializes to zero.

As described above, when a count of the counter 112 exceeds a predetermined threshold (step s5 in FIG. 5), it notifies the LAN signal repeater 13 that auto-negotiation is at a deadlock (step s6 in FIG. 5). When being notified of a deadlock, the LAN signal repeater 13 produces, in the Transparent-GFP unit 131, a Client Management Frame which sets a code indicating that auto-negotiation is at a deadlock, maps it on the SONET payload and transmits it to the repeating-transmission apparatus 2 (step s7 in FIG. 5). Meanwhile, LAN signals input to the LAN signal repeater 13 are encapsulated as client data into the Transparent-GFP frame in the Transparent-GFP unit 131, and are transmitted to the SONET transmitter 132, in which they are mapped on the SONET payload to be sent to the repeating-transmission apparatus 2.

When receiving SONET signals from the repeating-transmission apparatus 1 (step s11 in FIG. 6), the repeating-transmission apparatus 2 derives a frame from the SONET payload in the SONET transmitter 232 to send it to the Transparent-GFP unit 231 (step s12 in FIG. 6). The Transparent-GFP unit 231 checks whether or not the frame is Client Management Frame (step s13 in FIG. 6). If the frame is Client management Frame and the code set in the Client Management Frame has a code indicating the deadlock state of auto-negotiation (step s14 in FIG. 6), the optical signal control unit 22 disconnects optical signals therefrom for more than twice the propagation time of signals between the switches 3 and 4 (step s15 in FIG. 6). With the repeating-transmission apparatus 1 and 2, provisions are made for automatically measuring the propagation time of signals between the switches 3 and 4. And the propagation time is measured and set ahead of auto-negotiation sequences.

On the other hand, if the check result is a frame indicative of Client Data (step s16 in FIG. 6), the transparent-GFP unit 231 decapsulates the frame into LAN signals which are transmitted to the switch 4 (step s17 in FIG. 6).

Figure 7:
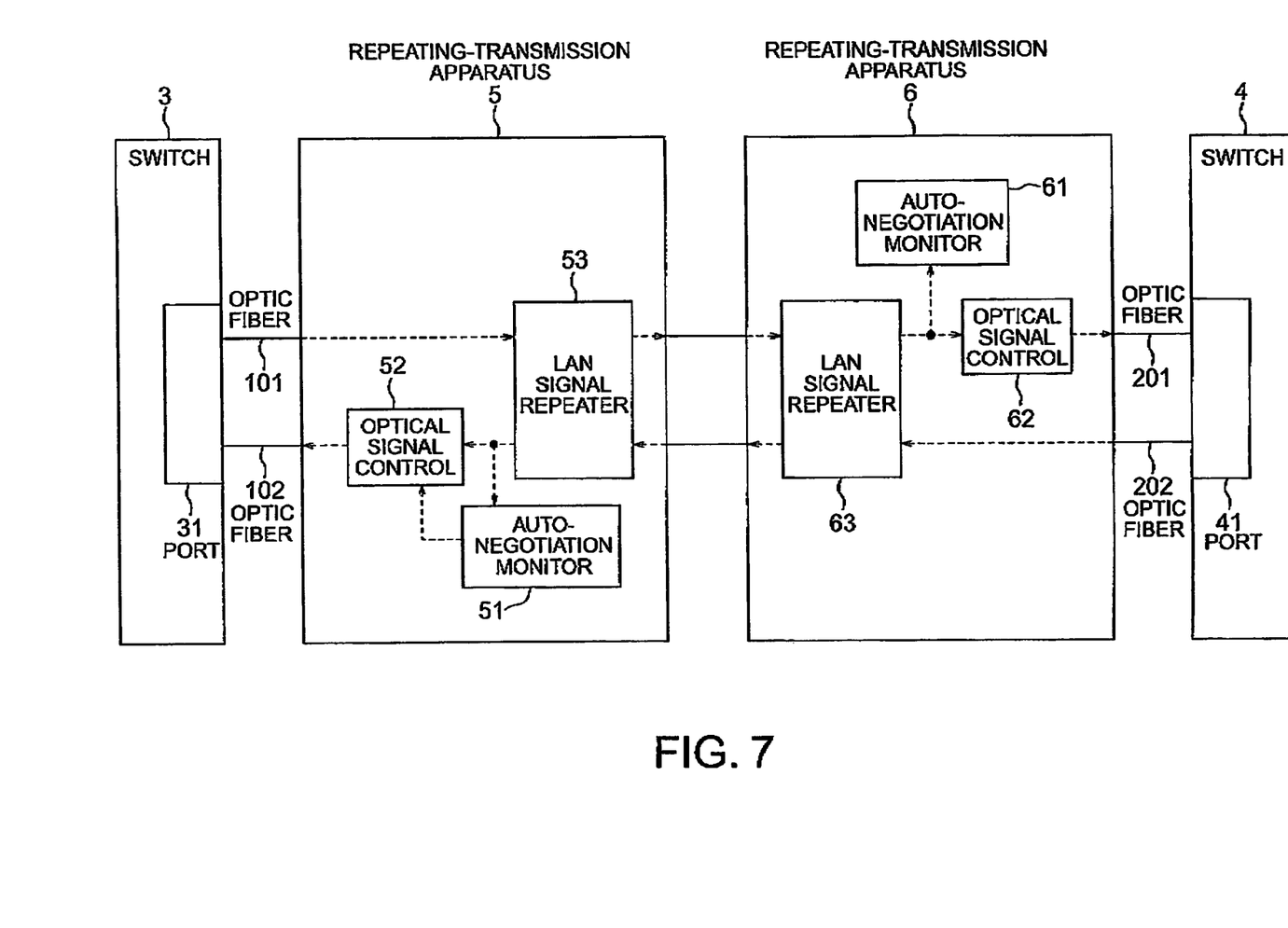
FIG. 7 is a block diagram of a network in accordance with the second embodiment of the present invention.

FIG. 7 is a block diagram of a network in accordance with the second embodiment of the present invention. In FIG. 7, the network has the same configuration as that of the first embodiment of the present invention shown in FIG. 1 except that the auto-negotiation monitor units 51 and 61 are arranged behind or at the rear ends of the LAN signal repeaters 53 and 63 with respect to inputs thereto, respectively, and receive output signals from the LAN signal repeaters 53 and 56.

The auto-negotiation monitor unit 51 discriminates auto-negotiation configuration codes among the input signals and counts up the number of times of identification. When the auto-negotiation monitor unit 51 counts the number of configuration codes which exceeds a predetermined threshold during a given period of time, and informs an optical signal control unit 52 thereof, which then disconnects optical signals for a fixed period of time, or for more than twice the propagation time of signals between the switches 3 and 4.

In this embodiment, since both supervision of auto-negotiation and control of optical signals are made in the same repeating-transmission apparatus, optical signals can be disconnected without notifying the opposed repeating-transmission apparatus 5 or 6 of the deadlock of auto-negotiation. In this case, LAN signal repeaters 53 and 63 need not have a means for notifying the opposed LAN signal repeaters 63 and 53 of malfunction with respect to the deadlock.

Figure 8:
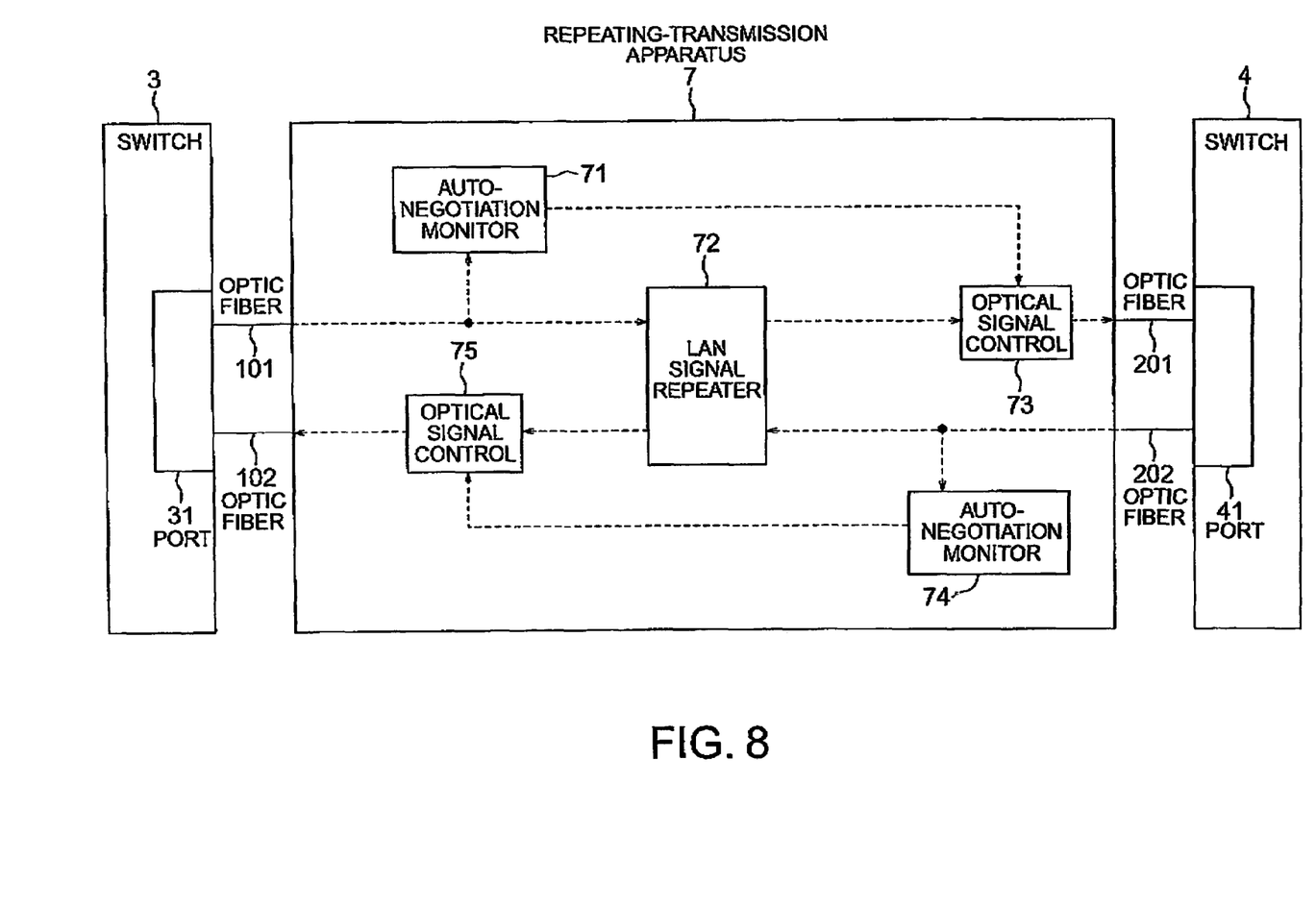
FIG. 8 is a block diagram of a network in accordance with the third embodiment of the present invention.

FIG. 8 is a block diagram of a network in accordance with the third embodiment of the present invention. In FIG. 8, the network of this embodiment differs from that of the first embodiment shown in FIG. 1 in that a single repeating-transmission apparatus 7 is employed. The repeating-transmission apparatus 7 includes a LAN signal repeater 72, auto-negotiation monitor units 71 and 74, and optical signal control units 73 and 75. The repeating-transmission apparatus 7 has a function of amplifying LAN signals input from the switches 3 and 4 in the LAN signal repeater 72, extending a distance along which LAN signals can be conveyed between the switches 3 and 4.

LAN signals from the switches 3 and 4 are input into the auto-negotiation monitor units 71 and 74 and the LAN signal repeater 72. The auto-negotiation monitor units 71 and 74 discriminate auto-negotiation configuration codes among the input LAN signals and count the number of the codes. If the number counted for a fixed period of time exceeds a predetermined number, the auto-negotiation monitor units 71 and 74 inform the optical signal control units 73 and 75 thereof, which then disconnect optical signals for more than a given period of time, that is, for more than twice the propagation time of optical signals between the switches 3 and 4.

In this embodiment, the auto-negotiation monitor units 71 and 74 monitor signals to be input to the LAN signal repeater 72 and detect a deadlock while the optical signal control units 73 and 74 control signals from the LAN signal repeater 72 in response to the detection of the deadlock from the monitor units 71 and 74.

Figure 9:
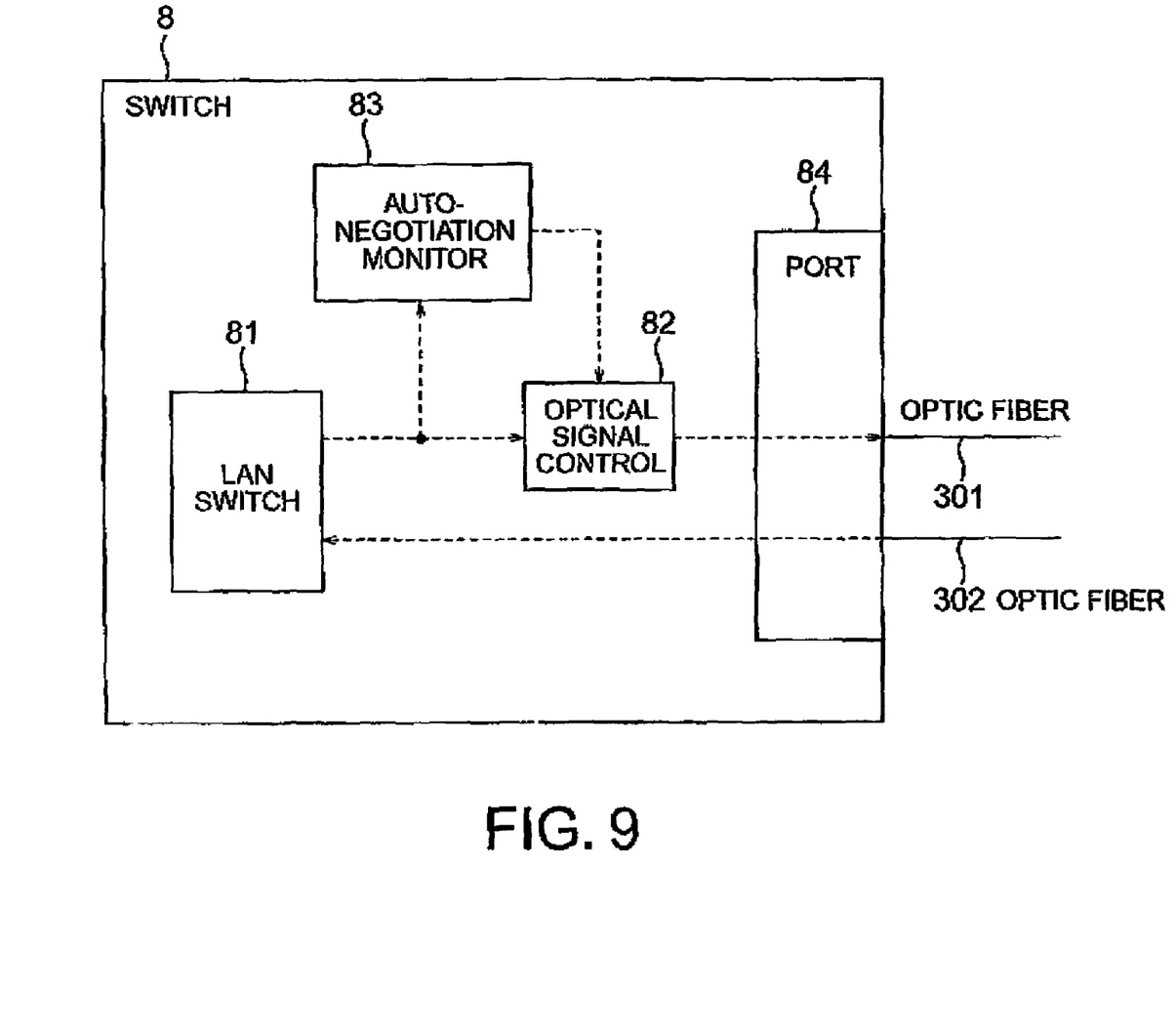
FIG. 9 is a block diagram of a switch in accordance with the fourth embodiment of the present invention.

FIG. 9 is a block diagram of a switch in accordance with the fourth embodiment of the present invention. In FIG. 9, the switch of the fourth embodiment is different from that of the first embodiment shown in FIG. 1 in that it does not use a repeating-transmission apparatus but contains an auto-negotiation monitor unit 83 and an optical signal control unit 82 in the switch 8.

The auto-negotiation monitor unit 83 monitors auto-negotiation configuration codes output from a LAN switch 81, and when finding that a predetermined number of auto-negotiation configuration codes has been output from the LAN switch 81 within a fixed period of time, it notifies the optical signal control unit 82 of a deadlock, which then disconnects the output of optical signals for more than a given period of time.

In short, for the state transition of auto-negotiation of the LAN switch 81, this embodiment adds a function of optical signal disconnection in the output of the switch 8 for a given period of time after outputting auto-negotiation configuration codes for a finite time.

Figure 10:
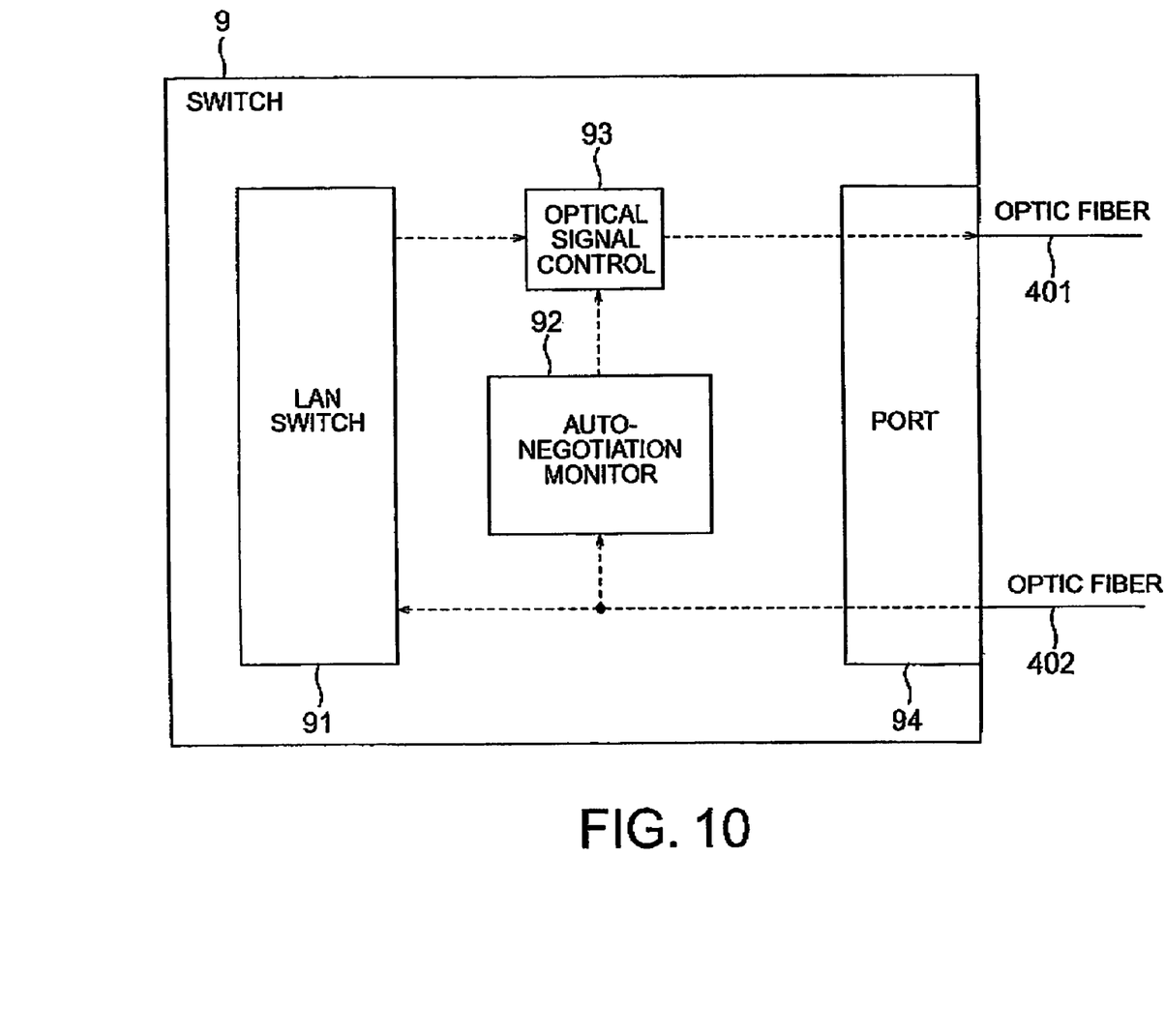
FIG. 10 is a block diagram of a switch in accordance with the fifth embodiment of the present invention.

FIG. 10 is a block diagram of a switch in accordance with the fifth embodiment of the present invention. In FIG. 10, the switch 9 differs from that of the first embodiment shown in FIG. 1 in that it does not use a repeating-transmission apparatus but contains therein an auto-negotiation monitor unit 92 and an optical signal control unit 93.

In the switch 9, the auto-negotiation monitor unit 92 monitors auto-negotiation configuration codes received from the opposed switch (not shown) through optical fiber 402, and causes the optical signal control unit 93 to disconnect optical signals to be sent to the opposed switch for more than a given period of time, when a predetermined number of auto-negotiation configuration codes are received within a fixed period of time.

In this embodiment, for the state transition of auto-negotiation of the LAN switch 91, a function of optical signal disconnection for a given period of time is added after auto-negotiation configuration codes are received for a fixed period of time.

Figure 11:
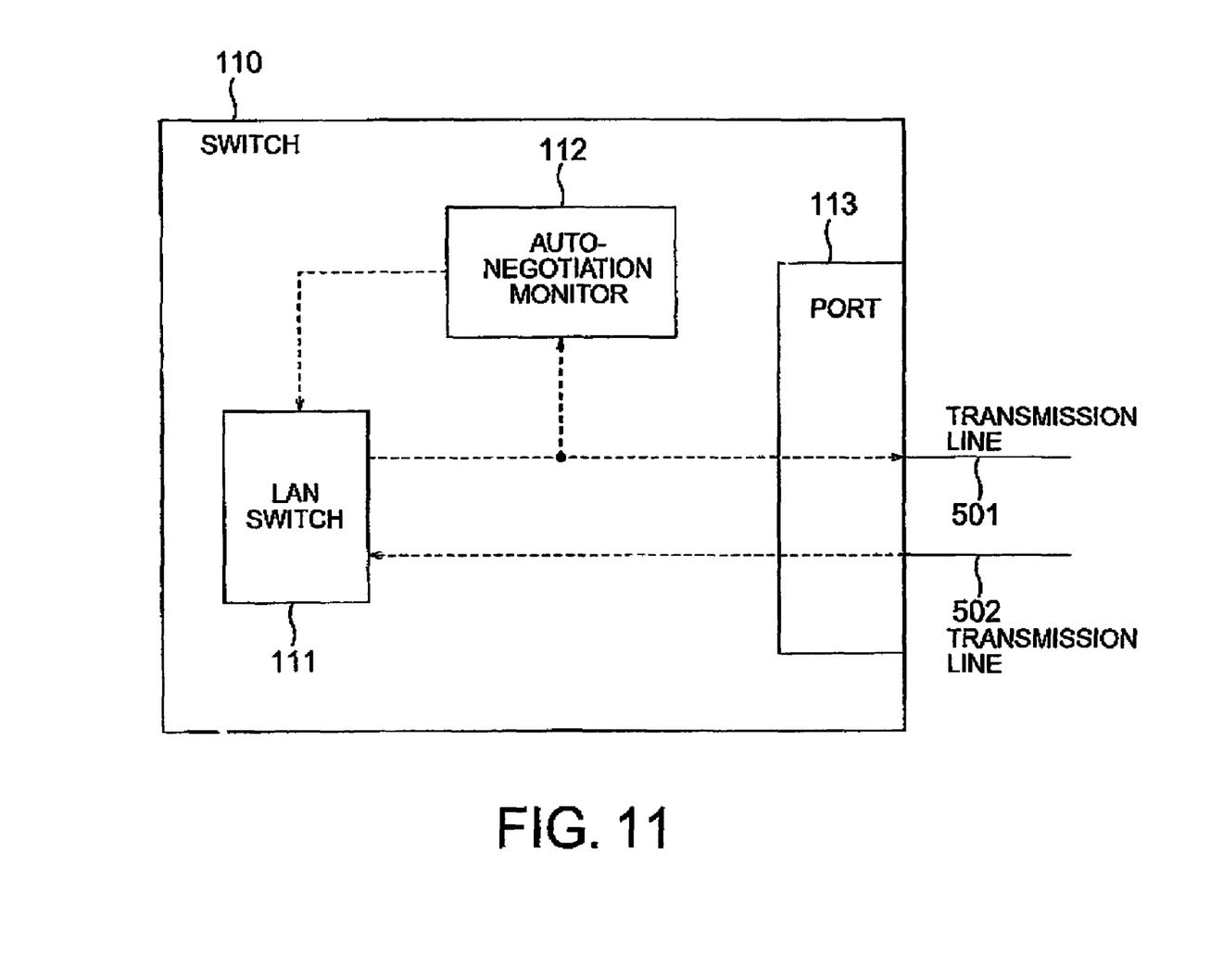
FIG. 11 is a block diagram of a switch in accordance with the sixth embodiment of the present invention.

FIG. 11 is a block diagram of a switch in accordance with the sixth embodiment of the present invention. In FIG. 11, the switch 110 of this embodiment may be used without a repeating-transmission apparatus and does not depend on the types of port 113, and types of transmission lines 501 and 502 correspond to transmission media, to which the types of port 113 are adapted.

More specifically, this embodiment is different from the first embodiment shown in FIG. 1 in that the switch 110 does not use a repeating-transmission apparatus and does not limit the types of port, so the port 113 may use not only the 1000-BASE-X but also the 1000-BASE-T, the 100-BASE-TX and the 10-BASE-T, and uses a reset of a LAN switch 111, not optical signal disconnection. Auto-negotiation protocol regarding the 1000-BASE-T, the 100-BASE-TX and the 10-BASE-T is specified in clause 28 of IEEE Standards 802.3-2002, section two, pages 213-260, (referred to as reference 3), which is incorporated by reference.

The switch 110 has functions of frame transfer and auto-negotiation defined in references 2 and 3, respectively. An auto-negotiation monitor unit 112 monitors auto-negotiation signals output from a LAN switch 111 and resets the LAN switch 111 when auto-negotiation signals are output beyond a given period of time.

Thus, for the state transition of auto-negotiation of the LAN switch 111, this embodiment adds a function of resetting the LAN switch 111 after outputting auto-negotiation signals for a given period of time.

Figure 12:
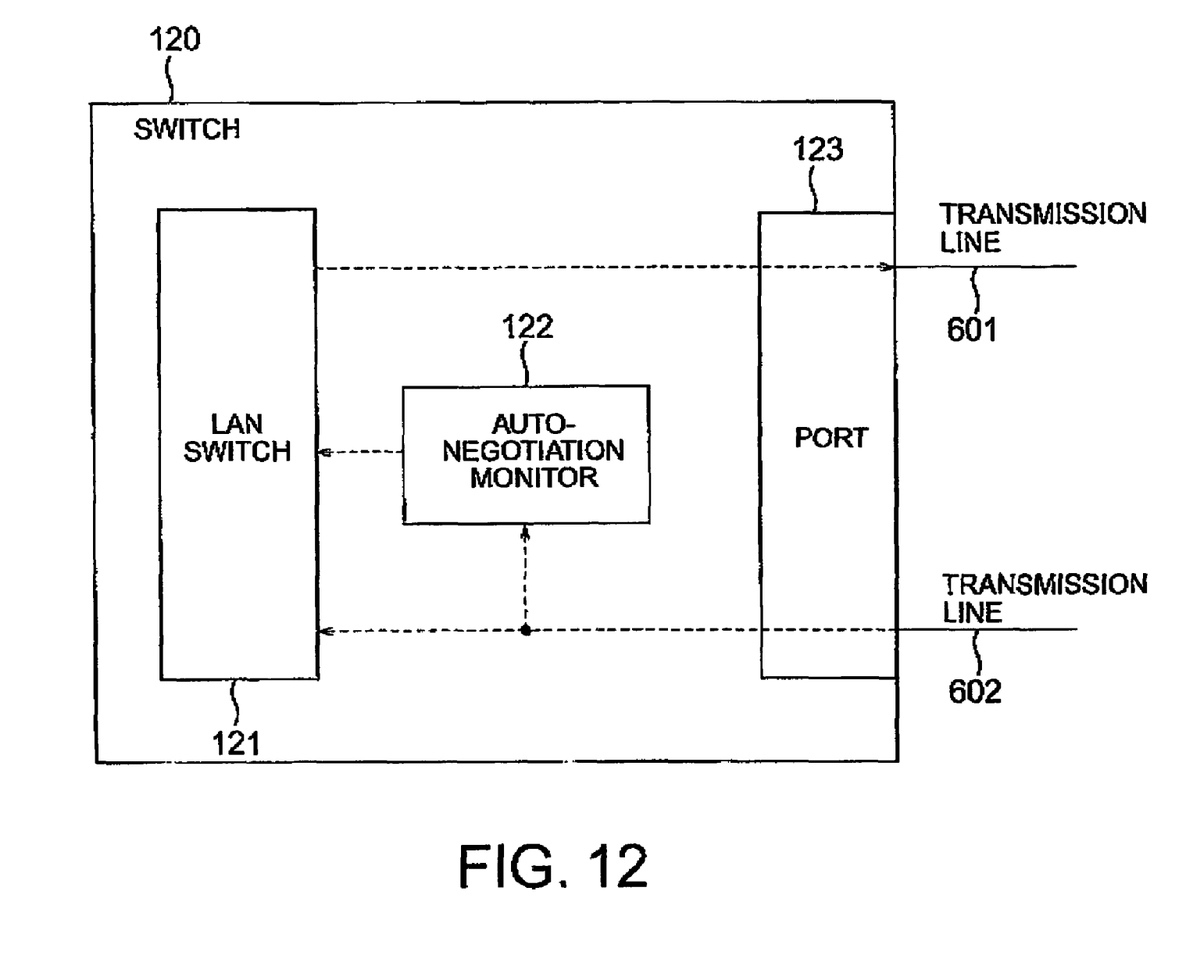
FIG. 12 is a block diagram of a switch in accordance with the seventh embodiment of the present invention.

FIG. 12 is a block diagram of a switch in accordance with the seventh embodiment of the present invention. In FIG. 12, the switch 120 of the seventh embodiment does not use a repeating-transmission apparatus and does not depend on the type of port 123 of the switch 120. Also, the types of transmission lines 601 and 602 correspond to transmission media to which the port 123 is adaptable.

More definitely, this embodiment differs from the first embodiment shown in FIG. 1 in that the switch 120 does not use a repeating-transmission apparatus, and does not limit the port type, so that not only the 1000-BASE-X but also the 1000-BASE-T, the 100-BASE-TX and the 10-BASE-T can be used for the port 123, and does not use optical signal disconnection but uses a reset of a LAN switch 121. The switch 120 has functions of frame transfer specified in reference 2 and of auto-negotiation specified in reference 3. An auto-negotiation monitor unit 122 monitors auto-negotiation signals received by a LAN switch 121 and resets the LAN switch 121 when auto-negotiation signals are input beyond a fixed period of time.

In short, for the state transition of auto-negotiation of the LAN switch 121, this embodiment adds a function of resetting the LAN switch 121 after receiving auto-negotiation signals for a fixed period of time.

Although the invention is described herein with reference to the preferred embodiments, one skilled in the art will readily appreciate that other applications may be substituted for those set forth herein without departing from the spirit and scope of the present invention. Accordingly, the invention should only be limited by the claims included below.

What is claimed is:

1. A network for transmitting Local Area Network (LAN) signals between first and second switch devices, comprising:
    a first repeating-transmission apparatus including:
        a first auto-negotiation monitor unit for monitoring given codes of auto-negotiation to execute a connection protocol between the first and second switch devices and detecting a deadlock state where the given codes are kept transmitted,
        a first optical signal control unit responsive to a detection of the deadlock state for disconnecting optical signals to be sent to one of the first and second switch devices for a given period of time, and
        a first LAN signal repeater which relays LAN signals; and
    a second repeating-transmission apparatus in communication with the first repeating-transmission apparatus including:
        a second auto-negotiation monitor unit,
        a second optical signal control unit, and
        a second LAN signal repeater, which relays the LAN signals.

2. The network according to claim 1, wherein one of the first and second auto-negotiation monitor unit detects the deadlock state when detecting more than a predetermined number of given codes within a predetermined period of time.

3. The network according to claim 1, wherein the given period of time is more than twice the propagation time of signals between said first and second switch devices.

4. The network according to claim 1, wherein the first LAN signal repeater of the first repeating-transmission apparatus conveys information of the deadlock state to the second repeating-transmission apparatus and wherein the second optical signal control unit of the second repeating-transmission apparatus receives the information of the deadlock state and disconnects the optical signal output to the second switch device.

5. The network according to claim 1, wherein at least one of the first and second auto-negotiation monitor unit monitors the output of a corresponding first or second LAN signal repeater and notifies a corresponding first or second optical signal control unit of the deadlock state in the same repeating-transmission apparatus.

6. The network according to claim 1, wherein one of the first and second auto-negotiation monitor unit monitors the given codes to be transmitted to a receiving side of an opposed switch device.

7. The network according to claim 1, wherein one of the first and second auto-negotiation monitor unit monitors the given codes transmitted from a sending side of an opposed switch device.

8. A network for transmitting Local Area Network (LAN) signals between first and second switch devices, at least one of the first or second switch device comprising:
    an auto-negotiation monitor unit for monitoring auto-negotiation to execute a connection protocol between the first and second switch devices and for detecting a deadlock state where the auto-negotiation is kept performed over a predetermined period of time;
    a LAN switch for producing the LAN signals, the LAN switch being responsive to a detection of the deadlock state being initialized; and
    an optical control unit to receive a notification of the deadlock state from the LAN switch and disconnect optical signals to be sent to the first or second switch device for a predetermined period of time.

9. A transmission repeater system for relaying LAN signals between first and second switch devices, comprising:
    a first repeating-transmission apparatus including:
        a first auto-negotiation monitor unit for monitoring given codes of auto-negotiation to execute a connection protocol between the first and second switch devices and detecting a deadlock state where the given codes are kept transmitted,
        a first optical signal control unit responsive to a notification of the deadlock state for disconnecting optical signals to be sent to any port of the first and second switch devices for a given period of time, and
        a first LAN signal repeater which relays LAN signals; and
    a second repeating-transmission apparatus in communication with the first repeating-transmission apparatus including:
        a second auto-negotiation monitor unit,
        a second optical signal control unit, and
        a second LAN signal repeater, which relays the LAN signals.

10. The transmission repeater system according to claim 9, wherein one of the first and second auto-negotiation monitor unit detects the deadlock state when detecting more than a predetermined number of given codes within a predetermined period of time.

11. The transmission repeater system according to claim 10, wherein the given period of time is more than twice the propagation time of signals between said first and second switch devices.

12. The transmission repeater system according to claim 9, wherein the first LAN signal repeater of the first repeating-transmission apparatus conveys information of the deadlock state to the second repeating-transmission apparatus and wherein the second optical signal control unit of the second repeating-transmission apparatus receives the information of the deadlock state and disconnects the optical signal output to the second switch device.

13. The transmission repeater system according to claim 9, wherein at least one of the first and second auto-negotiation monitor unit monitors the output of a corresponding first or second LAN signal repeater and notifies a corresponding first or second optical signal control unit of the deadlock state in the same repeating-transmission apparatus.

14. A first switch device for transmitting Local Area Network (LAN) signals to a second switch device, comprising:
an auto-negotiation monitor unit for monitoring auto-negotiation to execute a connection protocol between the first and second switch devices and for detecting a deadlock state where the auto-negotiation is kept performed over a predetermined period of time;
a LAN switch for producing the LAN signals, the LAN switch being responsive to a detection of the deadlock state being initialized; and
an optical control unit to receive a notification of the deadlock state from the LAN switch and disconnect optical signals to be sent to the first or second switch device for a predetermined period of time.

15. The first switch device according to claim 14, wherein the auto-negotiation monitor unit detects the deadlock state when detecting more than a predetermined number of given codes within a predetermined period of time.

16. The first switch device according to claim 14, wherein the given period of time is more than twice the propagation time of signals between the switch devices.

17. The first switch device according to claim 14, wherein the auto-negotiation monitor unit monitors the given codes to be transmitted from the first switch device.

18. The first switch device according to claim 14, wherein the auto-negotiation monitor unit monitors the given codes transmitted to the first switch device.

19. The first switch device according to claim 14, wherein the auto-negotiation monitor unit notifies the LAN switch of the detection of the deadlock state when the auto-negotiation is being performed longer than a predetermined period of time.

20. A method of controlling optical signals for a network for transmitting LAN signals between switch devices, which network comprises:
a first repeating-transmission apparatus including:
a first auto-negotiation monitor unit which monitors given codes of auto-negotiation to execute a connection protocol between the switch devices and detects a deadlock state where the given codes are kept transmitted, and
a first optical signal control unit, responsive to a detection of the deadlock state, which disconnects optical signals to be sent to one of the first and second switch devices for a given period of time, and
a first LAN signal repeater which relays LAN signals; and
a second repeating-transmission apparatus in communication with the first repeating-transmission apparatus including:
a second auto-negotiation monitor unit,
a second optical signal control unit, and
a second LAN signal repeater, which relays the LAN signals, the method comprising:
a first step of detecting, by monitoring the given codes of the auto-negotiation to execute the connection protocol between the switch devices, the deadlock state where the given codes are kept transmitted from one of the switch devices; and
a second step of disconnecting the optical signals for the given period of time when the deadlock state is detected.

21. The method according to claim 20, further comprising:
a third step of sending a notification about the deadlock state when detecting more than a predetermined number of the given codes within a predetermined period of time.

22. The method according to claim 21, wherein the given period of time is more than twice the propagation time of signals between the switch devices.

23. The method according to claim 22, wherein the first, second and third steps are performed in at least one of the first and the second repeating-transmission apparatus.

24. The method according to claim 23, wherein the first LAN signal repeater is adapted to convey information of the deadlock state to the second repeating-transmission apparatus.

25. The method according to claim 22, wherein the first, second and third steps are performed in one of the first and the second repeating-transmission apparatus.

26. A method of controlling transmission of signals of auto-negotiation for a network for transmitting LAN signals between first and second switch devices, comprising:
monitoring predetermined auto-negotiation codes which are being executed to establish a connection protocol between the first and second switch devices;
detecting a deadlock state, when the time of the auto-negotiation exceeds a predetermined period of time;
producing LAN signals in response to detecting the deadlock state being initialized;
receiving a notification of the deadlock state via the LAN signals; and
disconnecting optical signals to be sent to the first or second switch device for a predetermined period of time.

27. The method according to claim 26, wherein monitoring includes:
monitoring the given codes to be transmitted from the first switch device.

28. The method according to claim 26, wherein monitoring includes:
monitoring the given codes transmitted from the second switch device.

* * * * *